Patented Feb. 16, 1937

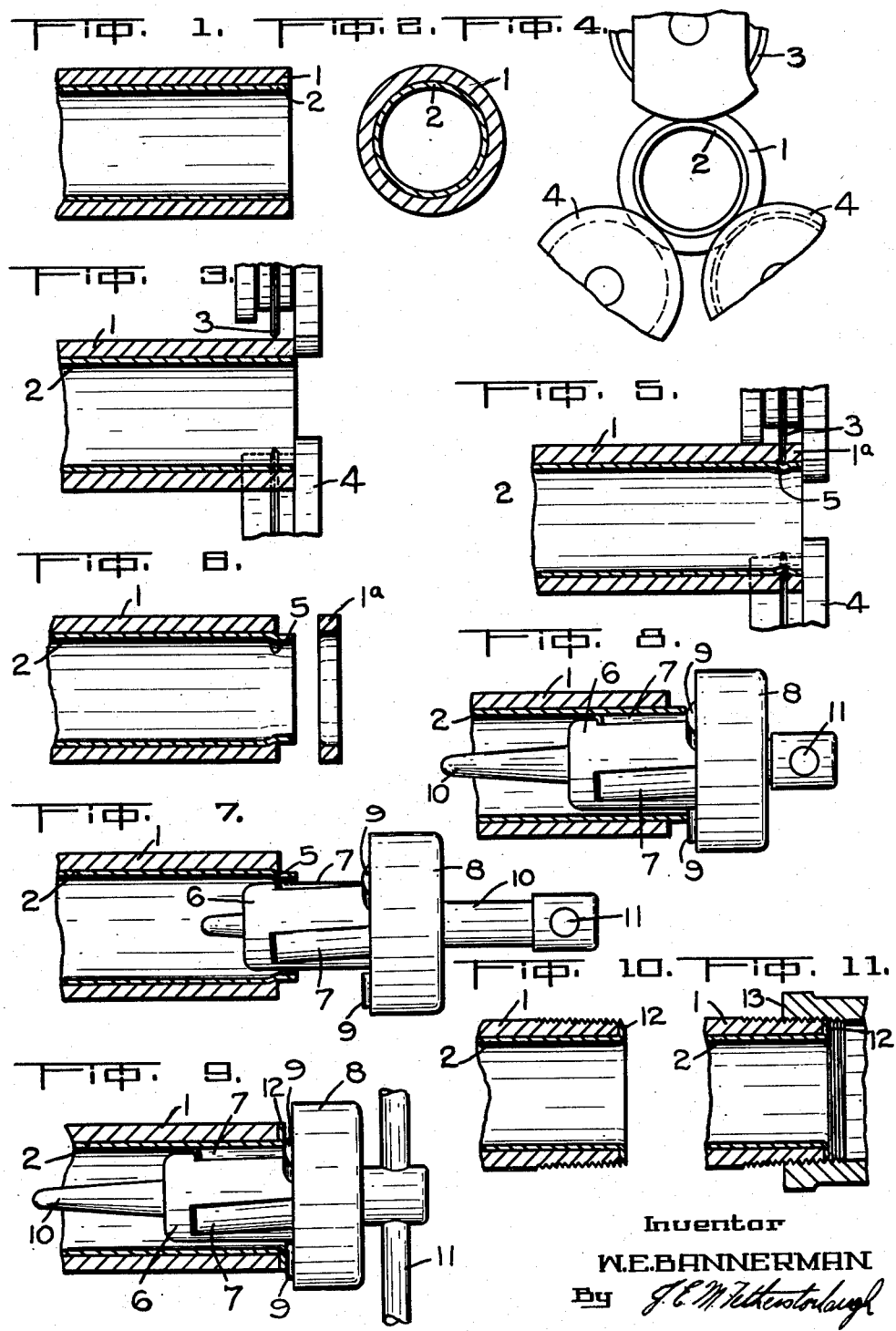

2,070,852

UNITED STATES PATENT OFFICE 2,070,852

METHOD OF FORMING LINED PIPE ENDS

William Ewart Bannerman, Toronto, Ontario, Canada

Application April 6, 1935, Serial No. 15,013

8 Claims. (Cl. 153—81)

My invention relates to improvements in methods of forming lined pipe ends and the object of the invention is to devise a method which will lend the pipe end susceptible for direct insertion into a standard fitting of non-corrodible material for forming a non-corrodible joint.

A further object is to devise a method for forming lined pipe ends for the above purpose which is equally applicable for use in pipe mills on standard lengths of pipe and for use in the field or on the job by plumbers, steamfitters and the like for forming the ends on pipe cut to required lengths.

A still further object is to devise a method whereby the pipe ends may be formed with simple tools such as are ordinarily used in the plumbing or steamfitting trades.

Hitherto, the disadvantage in employing lined pipe in the installation of water and heating systems has been the necessity of using special fittings for effecting the joints between pipes. Not only do these special fittings entail considerable extra cost but their installing is troublesome to the plumber or steamfitter. By my method as hereinafter described, I can form the ends of the pipe so as to be susceptible for use with a standard fitting of non-corrodible metal to constitute a joint that is non-corrodible. Moreover, as above referred to, such pipe ends may, in the case of pipes of standard length, be formed in the mill but what is even more important plumbers or steamfitters may form the ends on the job with simple tools on pipe cut to the required length for their purpose.

In the accompanying drawing the several steps in my method of forming a pipe end are illustrated.

Fig. 1 represents a longitudinal section through the end of a lined pipe.

Fig. 2 is a cross-section thereof.

Fig. 3 is a longitudinal section through a lined pipe showing a pipe cutter applied thereto for cutting off a portion of the outer shell.

Fig. 4 is an end view of the pipe and cutter illustrated in Fig. 3.

Fig. 5 is a similar view to Fig. 3 showing the cutter in the position wherein it has cut through the outer shell of the pipe.

Fig. 6 is a longitudinal section through the lined pipe showing a portion of the outer shell removed and the liner protruding from the remaining portion of the shell.

Fig. 7 is a similar view showing a combined expander and flanger introduced into the pipe, the expanding elements being shown in the initial position for removing the burr formed on the liner due to the cutting off of the portion of the shell.

Fig. 8 is a similar view showing the expanding elements of the expander and flanger having removed the burr and the flanging elements about to flange the protruding end of the liner.

Fig. 9 is a similar view with the expander and flanger in such position that the protruding end of the liner has been flanged against the end of the shell.

Fig. 10 is a longitudinal section through the finished pipe end which has been exteriorly threaded by an orthodox pipe die, and Fig. 11 is a similar view showing such pipe end threaded into a standard fitting of non-corrodible metal.

Like characters of reference indicate corresponding parts in the different views.

According to my invention, I take a length of lined pipe as illustrated in Fig. 1 and which consists of an outer shell 1 composed of steel or wrought iron or the like and a liner 2 of non-corrodible metal of greater ductility than the shell, such as copper, and to form the end suitable for threading into a standard fitting of non-corrodible metal, I first apply to the shell 1 a pipe cutter of similar form to a standard tool and including a rotary cutter blade 3 and rollers 4. The construction of a suitable cutter for the purpose is described and claimed in my copending application Serial No. 15,012, filed April 6, 1935 for improvements in Pipe cutters. I rotate this tool so that it cuts entirely through the shell 1 a predetermined distance from the pipe end without cutting the liner 2 as is illustrated in Figs. 3, 4, 5 and 6 of the drawing. When this is done, the portion 1ᵃ of the shell 1 between the incision made by the cutter and the end of the shell which is of ring-like form is removed and this will leave the end of the liner 2 protruding beyond the end of the shell as is illustrated in Fig. 6.

During the cutting off of the portion 1ᵃ of the shell, the liner may become slightly burred as illustrated at 5, Figs. 5 and 6.

I then introduce into the end of the lined pipe a tool which I term a combined expander and flanger. This tool may consist of a hollow member 6 freely carrying the raked rollers 7 and having a circumferential flange 8 with rollers 9 inset in the face of the flange 8 facing the rollers 7. A tapered spindle 10 is inserted through the member 6 and forces the rollers 7 against the interior of the liner 2. The spindle 10 is provided with a handle 11, and the device is rotated by such handle. The construction of the combined expander and flanger is described and claimed in my copending application Serial No. 15,014, filed April 6, 1935, for improvements in Combined expanders and flangers and forms no part of the present invention, being shown and described merely to illustrate the method of forming the pipe end.

When the member 6 is inserted into the end of the lined pipe as illustrated in Fig. 6 and the tapered spindle 10 is inserted into the member, upon inward axial pressure being exerted on the spindle, the rollers 7 are forced outwardly against the interior of the liner 2. By rotating the spindle, these rollers 7 which contact therewith are rotated and the member 6 revolved with the result that the rollers 7 remove or roll out the burr on the inside of the liner 2.

As the member 6 is forced further into the pipe end, the rollers 9 engage the protruding end of the liner 2 and roll it outwardly forming it into a flange 12 which is eventually brought into engagement with the end of the shell completely covering it. Such step is clearly and progressively illustrated in Figs. 7, 8 and 9 of the drawing.

The pipe end then assumes the form illustrated in Fig. 10 with the exception that it is unthreaded. By applying an ordinary pipe die (not shown) to the end of the pipe, it is externally threaded preferably in the form of a tapered thread, such die cutting the thread not only in the outer surface of the shell 1 but in the peripheral edge of the liner flange 12 and further serving to force such flange edge into more intimate contact with the shell.

The pipe is now ready to be threaded into a standard fitting 13 (as illustrated a coupling) as shown in Fig. 11 of the drawing wherein it will be observed that the non-corrodible lining completely covers the corrodible metal of the shell and with the fitting 13 makes a non-corrodible joint for the pipe.

It is to be understood that the entire or any tools employed for carrying out the various steps in the method may be replaced by any other suitable devices or apparatus which may be suitable for the purpose without affecting my invention.

A method such as described above enables the pipe end to be suitably formed either at the mill, or in the field or on the job so as to be capable of being threaded directly into a standard non-corrodible fitting.

What I claim as my invention is:

1. In a method of forming the ends of lined pipes, the steps which consist in cutting through the shell of the pipe by a circumferential incision spaced a predetermined distance from the pipe end, removing the portion of the shell between the incision and the pipe end leaving the end of the liner protruding beyond the remaining portion of the shell, and flanging such protruding portion of the liner so that it completely covers the end of the remaining portion of the shell and is in intimate contact therewith.

2. In a method as claimed in claim 1, the additional step which consists in finally exteriorly threading the pipe end thus formed so that the threads are cut in the peripheral edge of the flange of the liner and in the outer surface of the adjacent portion of the shell.

3. In a method of forming the ends of lined pipes, the steps which consist in cutting through the shell of the pipe by a circumferential incision spaced a predetermined distance from the pipe end, removing the portion of the shell between the incision and the pipe end leaving the end of the liner protruding beyond the remaining portion of the shell, and by a rolling operation flanging such protruding portion of the liner so that it completely covers the end of the remaining portion of the shell and is in intimate contact therewith.

4. In a method as claimed in claim 3, the additional step which consists in forming a continuous thread in the peripheral edge of the flange of the liner and in the outer surface of the adjacent portion of the shell.

5. In a method of forming the ends of lined pipes, the steps which consist in cutting through the shell of the pipe by a circumferential incision spaced a predetermined distance from the pipe end, said cutting operation forming a burr in the interior face of the liner, removing the portion of the shell between the incision and the pipe end leaving the end of the liner protruding beyond the remaining portion of the shell, rolling out the burr in the interior of the liner, and subsequently by a rolling operation flanging such protruding portion of the liner so that it completely covers the end of the remaining portion of the shell and is in intimate contact therewith.

6. In a method of forming the ends of lined pipes, the steps which consist in cutting through the shell of the pipe by a circumferential incision spaced a predetermined distance from the pipe end, said cutting operation forming a burr in the interior face of the liner, removing the portion of the shell between the incision and the pipe end leaving the end of the liner protruding beyond the remaining portion of the shell, rolling out the burr in the interior of the liner, subsequently by a rolling operation flanging such protruding portion of the liner so that it completely covers the end of the remaining portion of the shell and is in intimate contact therewith, and finally forming a continuous thread in the peripheral edge of the flange of the liner and in the outer surface of the adjacent portion of the shell.

7. In a method of forming the ends of lined pipes, the steps which consist in cutting through the shell of the pipe by a circumferential incision spaced a distance from the end of the pipe equal to the thickness of the shell, removing the portion of the shell between the incision and the pipe end leaving the end of the liner protruding beyond the remaining portion of the shell a distance equal to the thickness of the shell, and flanging such protruding portion of the liner so that it completely covers the end of the remaining portion of the shell and is in intimate contact therewith.

8. In a method as claimed in claim 7, the additional step which consists in finally exteriorly threading the pipe end thus formed so that the threads are cut on the peripheral edge of the flange of the liner and in the outer surface of the adjacent portion of the shell.

WILLIAM EWART BANNERMAN.